(12) United States Patent
Daugaard

(10) Patent No.: US 6,739,504 B2
(45) Date of Patent: May 25, 2004

(54) METHOD AND SYSTEM FOR ENSURING CONNECTION OF A MODULE TO AN ELECTRONIC APPARATUS

(75) Inventor: Kim Daugaard, Roskilde (DK)

(73) Assignee: Tellabs Denmark A/S, Ballerup (DK)

( * ) Notice: Subject to any disclaimer, the term of this patent is extended or adjusted under 35 U.S.C. 154(b) by 0 days.

(21) Appl. No.: 10/105,506

(22) Filed: Mar. 20, 2002

(65) Prior Publication Data

US 2002/0100799 A1 Aug. 1, 2002

Related U.S. Application Data

(63) Continuation of application No. 09/297,216, filed as application No. PCT/DK97/00465 on Oct. 22, 1997, now Pat. No. 6,422,461.

(51) Int. Cl.[7] .................................................. G06K 5/00
(52) U.S. Cl. ........................ 235/380; 235/379; 235/441; 235/492
(58) Field of Search ................................ 235/380, 379, 235/441, 492, 385; 705/43, 44

(56) References Cited

U.S. PATENT DOCUMENTS

| | | | | |
|---|---|---|---|---|
| 3,702,392 A | * | 11/1972 | St. Jean | 235/380 |
| 3,790,754 A | * | 2/1974 | Black et al. | 235/380 |
| 4,351,982 A | * | 9/1982 | Miller et al. | 380/30 |
| 4,408,203 A | * | 10/1983 | Campbell | 705/71 |
| 4,424,414 A | * | 1/1984 | Hellman et al. | 380/30 |
| 4,471,164 A | * | 9/1984 | Henry | 380/30 |
| 4,484,067 A | * | 11/1984 | Obrecht | 235/380 |
| 4,549,075 A | * | 10/1985 | Saada et al. | 713/169 |
| 4,672,533 A | * | 6/1987 | Noble et al. | 340/5.74 |
| 4,723,284 A | * | 2/1988 | Munck et al. | 713/159 |
| 4,748,668 A | * | 5/1988 | Shamir et al. | 380/30 |
| 4,797,920 A | * | 1/1989 | Stein | 705/72 |
| 4,851,653 A | * | 7/1989 | Limisaque et al. | 235/492 |
| 4,935,962 A | * | 6/1990 | Austin | 713/159 |
| 5,293,029 A | * | 3/1994 | Iijima | 235/380 |
| 5,365,466 A | * | 11/1994 | Hazard | 708/250 |
| 5,379,344 A | * | 1/1995 | Larsson et al. | 380/251 |
| 5,625,693 A | * | 4/1997 | Rohatgi et al. | 713/187 |
| 5,625,695 A | * | 4/1997 | M'Raihi et al. | 380/28 |

FOREIGN PATENT DOCUMENTS

| | | |
|---|---|---|
| EP | 0 262 859 | 4/1988 |
| EP | 0 379 333 | 7/1990 |

\* cited by examiner

Primary Examiner—Thien M. Le
Assistant Examiner—Uyen-Chau N Le
(74) Attorney, Agent, or Firm—Baker Botts L.L.P.

(57) ABSTRACT

A method for ensuring that modules to be connected to an apparatus comprising a processor are of a specific type, includes providing these modules with a code circuit capable of outputting one or more code words on request. When a module has been connected to the system, the processor of the apparatus reads one or more of the code words from the code circuit of the module, compares the read code word or words with reference code words stored in the apparatus, and rejects the module if the read code word or words do not correspond to the reference code words. A large number of different code words are stored in the code circuit of the specific type, and the code circuit is moreover adapted such that a code word can be output correctly only after the lapse of a prefixed period of time, which is considerably longer than a normal output time determined by the implementation of the code circuit, after a previous output of a code word.

20 Claims, 2 Drawing Sheets

METHOD AND SYSTEM FOR ENSURING CONNECTION OF A MODULE TO AN ELECTRONIC APPARATUS

RELATED APPLICATION

This application is a continuation of U.S. application Ser. No. 09/297,216 filed Jun. 23, 1999, now U.S. Pat. No. 6,422,461 which is a 371 of and claims the benefit of PCT Application No. PCT/DK97/00465 filed Oct. 22, 1997 from Denmark Application No. 1169/96 filed Oct. 23, 1996.

TECHNICAL FIELD OF THE INVENTION

The invention concerns a method and system to ensure that modules to be connected to an apparatus comprising a processor are of a specific type, wherein modules of the specific type are provided with a code circuit capable of outputting one or more code words on request, and wherein the processor of the apparatus, when a module has been connected to the system, reads one or more of said code words from the code circuit of the apparatus, compares the read code word or words with reference code words stored in the apparatus, and rejects the module if the read code word or words do not correspond to the reference code words.

The invention also concerns a module capable of being connected to such an apparatus, and a code circuit as well as a storage medium for storage of data and for use in such a system.

BACKGROUND OF THE INVENTION

Many technical systems comprise an apparatus to which a plurality of modules may be connected. Typically, it may e.g. be an electronic device comprising a central control unit to which a plurality of external printed circuit cards may be connected depending on the use. The electronic device may e.g. be a network element in a telecommunications network or a control system for a manufacturing process.

Other examples of such modules may be battery packet for a mobile telephone a component or a spare part which may be connected to the electrical system in a car or to the car in general, or a probe for a measuring instrument.

Such systems have the advantage that the technical solution may be composed of individually selected modules.

For several reasons, when a module is connected to the system, it may be expedient to be able to detect whether the other module is a specific type. It may e.g. be a matter of checking that the connected module is supplied by the supplier who has also supplied the main system, since this is the only way to ensure that the system operates as specified by the supplier. This may e.g. be the case where problems for measuring instrument, are calibrated for each individual measuring instrument, and where it may thus be essential to ensure that the correct probe is connected.

In respect of high-technology products, extension modules and spare parts for the products are produced in large numbers. However, it happens frequently that other suppliers make copies having the same function as the original products, but at a lower price. It may be expedient for a manufacturer of the original products to protect himself against copy products, partly because reliability and quality might be impaired when the original modules are replaced by copy modules, and partly because of the loss of earnings from the sale of the original products.

It is known to prevent interconnection of such elements by various physical obstacles, which, however, are generally easy to imitate by a copy manufacturer.

Further, the art in the software field includes a large number of methods for access control and limitation of copying of e.g. discs or CD-ROM with programs such as e.g. games. These methods, however, are not suitable for preventing connection of hardware modules to e.g. an electronic apparatus.

Known are also electronic systems in which a code circuit on a module must apply a code word before the module will be accepted by the main system, as is known also from e.g. payment cards in financial systems.

When mechanical and electronic systems can be physically accessed, however, it will frequently be possible to expose details of the structure and thereby evade the methods which just permit combination with certain modules. In the case of the code word which has to be applied by the module, it will e.g. be possible to find the code word by outputting it in the same manner as is done in the original system. Thus, all that needs to be done is to obtain a sample of the original module, and then the code word of this module may be read and copy modules may be manufactured with the same code word.

From U.S. Pat. No. 4,851,653 a system in which a confidential code is introduced to a memory card to get access to the memory of the card is known. On the card the introduced code is compared to a reference code and only in case of a match between the introduced code and the reference code access is provided to the memory. A built-in time delay ensures that a certain time must pass between each attempt at introducing a code. In this manner it is ensured that an unauthorized user cannot just try with a high number of different codes in a short time. By systems of the above described type, in which modules are connected to an apparatus, this system does not, however, provide any security, because an unauthorized card can just read the code word used by an authorized card and subsequently use the same code word, since only one reference code is used. Therefore, the system can be cracked by a simple interception.

A similar system is used according to EP 379 333 in which a finger print of a person is compared with a reference finger print stored in digital form on a credit card. Also here, a single reference code that can be uncovered by interception is used, and therefore also this system does not provide sufficient security in the systems mentioned above.

WO 86/03864 discloses a system for establishing connection between a computer terminal and a main computer. Instead of a usual code word or pass word this system uses a new random code word each time a connection between a given terminal and the main computer is to be established. Before termination of a connection the terminal generates a new code word, which is sent to the main computer in which it is stored. It is also stored in the terminal itself. Next time this terminal wishes a connection to the main computer it must be able to provide exactly this code word to the main computer. In this way it is ensured that an unauthorized terminal cannot just intercept the code word from an authorized terminal and subsequently use the same code word itself. However, this system only ensures that the main computer—when the system has been initialed and is in normal use—only accepts communication with a terminal to which it has communicated before. When a terminal is connected to the computer for the first time the security procedure must be by-passed and, therefore, the security is totally dependent on the person taking care of the connection of new terminals to the system. Therefore, this principle cannot be used in the situations mentioned above and with which the present invention is concerned.

Another principle that attempts to overcome the risk of interception of a code word is known from DE 44 11 780. Here, the code word is changed dependent on the actual time. A user introduces on a terminal or a module a primary code word which is then converted into a corresponding secondary code word. This code word is combined with a time signal representing the actual time, which is received from a radio transmitter, and the result is used as address to a ROM device of e.g. 32 kbytes. The content of the selected address is transmitted to the receiver unit which has a similar ROM device and knows the correct secondary code word. Also here the known secondary code word is combined with the actual time signal to form an address to the ROM device and the resulting content must correspond to that received from the terminal. As the actual time signal is changed all the time a code word that is intercepted can only be used for a very short time, i.e. until the time signal is changed. This could e.g. happen every 6 minutes. However, this principle has the drawback that if an unauthorized user once knows the principle he only has to get access to an authorized unit and then copy the ROM device, which can be done in a very short time. With a copy of the original ROM device the unauthorized module can without any difficult generate correct code words. It is also a drawback with this principle that the central apparatus as well as each unit or module must be provided with a radio receiver for the time signals and also must be placed in a location where these signals can be received.

SUMMARY OF THE INVENTION

Accordingly, the object of the invention is to provide a method and a system which ensure that only modules of the specific type can be connected to the system, and in which the incorporated code circuits are impossible to copy with a reasonable period of time.

This is achieved according to the invention by a method wherein a large number of different code words is stored in the code circuit on modules of the specific type, and wherein the code circuit is moreover so adapted that a code word can be output correctly only after the lapse of a prefixed period of time, which is considerably longer than the normal output time determined by the implementation of the code circuit, after a previous output of a code word.

When ensuring on one hand that a large number of code words is present and on other hand that a considerable period of time has to elapse between each time a code word can be output, then it will take an extremely long time to output and thus copy the contents of the code circuit. Thus copying of the code circuit has been made impossible in practice.

In an expedient embodiment, the code circuit on each module comprises an addressable storage in which one of said code words is stored on each storage address.

The code word of a given storage address in said storage is allowed to be the same for all the modules, it is ensured that the same code circuit may be used on all the modules, and that it therefore suffices to store one set of reference code words in the apparatus. A particularly expedient embodiment is obtained when the reference code are formed by a code circuit like the code circuits arranged on the modules. It is hereby ensured in a simple manner that it will be just as different to copy the code words from the apparatus as for the individual modules.

When moreover, the apparatus is adapted to read code words from the same storage address or addresses on each module at start, it is ensured that the apparatus need only read code words from its own code circuit or its own reference table once, since the same answer is to come from all the modules. This will save some time particularly in the situation where the apparatus contains a code circuit like that of the modules, since, otherwise, the apparatus would have to wait said period of time between each output from its own code circuit.

As mentioned, the invention moreover concerns a module which may be used in a system and a method as described above.

Either, the code circuit of the module may comprise means for calculating code words from a bit pattern consisting of a plurality of digital input signals, or it may comprise an addressable storage in which one of said code words is stored on each storage address. In the latter case, the addressable storage may expediently be of ROM type.

The code circuit is adapted to receive an address consisting of a large number of bits and to calculate, from this, a modified address consisting of a smaller number of bits, and the number of storage addresses is adapted such that the smaller number of bits is just sufficient to address all the storage addresses, it is ensured that the copying time will be extremely great even with a storage of a limited size, since, seen from the outside, the storage appears to have a number of bit positions which corresponds to the large number of bits. Thus, if e.g. a 32-bit address is used, which is modified to a 16-bit address in the code circuit, a storage circuit of 64 kbytes will look like a storage circuit of 232 bytes, and, if the preselected period of time is e.g. one second, it will take 232 seconds, which corresponds to more than 136 years, to output and thereby to copy the contents of the code circuit.

In particular when the code circuit is adapted to receive an address consisting of a large number of bits, it may be advantageous to adapt the code circuit to receive said address in serial form.

The means necessary for determining the prefixed period of time may be positioned internally in the code circuit. This ensures that there is no possibility of affecting the period of time from the outside, nor is it thus possible to increase the output rate. On the other hand, the components required for this will take up space on the code circuit itself. Alternatively, the code circuit may comprises means for determining the prefixed period of time by counting a plurality of clock periods for a clock signal which is supplied to the code circuit. Component space may hereby be saved in the code circuit; but it will be possible to increase the output rate by increasing the frequency of the external clock signal. However, this may be counteracted in a simple manner by selecting a clock frequency which is close to the maximum clock frequency at which the circuit can operate. If it is attempted to output the code words with an even higher frequency, the circuit will merely stop operating. A lower frequency will correspondingly mean a lower output rate.

In an expedient embodiment, the code circuit is implemented as a customer-specified integrated circuit (ASIC), which comprises the addressable storage as well as the means for determining the prefixed period of time. This improves the possibility of preventing others from outputting and thereby copying the contents of the code circuit within a reasonable period of time.

Either the means ensuring that a code word can be output correctly only if a prefixed period of time after a previous output has elapsed, may be adapted simply not to apply a code word if output is requested before the lapse of said period of time, or where such output is requested, they may be adapted to output one or more wrong code words. The latter possibility makes it even more difficult to perform unauthorized output of the contents of the code circuit.

Further, the code circuit may be adapted such that a code word can be output correctly also only if said period of time has elapsed from the start of the module concerned. This ensures that also the first output can only take place after said time delay.

Finally, as mentioned, the invention also concerns a code circuit for the storage of a plurality of code words and a storage medium for the storage of data and for use in a system as well as a method as described above. Such a storage medium is adapted such that data can be output correctly from the storage medium only after the lapse of a predefined period of time, which is considerably longer than a normal output time determined by the implementation of the storage medium, after a previous output of data.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
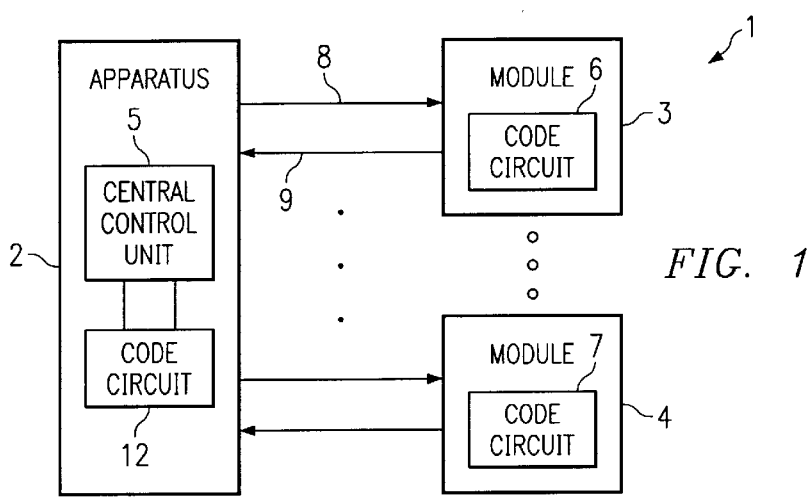
FIG. 1 shows a system in which the invention may be applied.

FIG. 1 shows an example of how the invention may be applied to ensure that modules to be connected to an apparatus or a system are a specific type. The figure schematically shows a system 1 which consists of an apparatus 2 and a plurality of modules, of which the modules 3 and 4 are shown here. The system 1 may e.g. be an electronic control system for manufacturing process or a network element in a telecommunications system, and in that case the apparatus 2 may contain a central control unit 5 and other common components for the system, while the modules 3 and 4 may be printed circuit cards including the system input and output circuits, which may be provided in arbitrary numbers, and the system may typically be extended later by the addition of further printed circuit cards. Since these printed circuit cards will frequently be added to the system after its initialization, it may be of great importance to be able to ensure that only printed circuit cards of a specific and approved type can be connected. This is done partly to be certain that the system, also after addition, will be able to comply with the specifications originally given, and partly to ensure for commercial reasons that no so-called pirate copies of the printed circuit cards are used.

Such a security may be established e.g. by providing each of the printed circuit cards 3, 4 with a code circuit 6, 7 which is capable, on request of giving a predetermined code word. When e.g. the printed circuit card 3 has been connected to the system, the central control unit 5 may request the printed circuit card 3 via the connection 8 to identify itself by means of the code circuit 6 by giving the correct code word via the connection 9. As mentioned above, this system however, has the drawback that it will be relatively simple for a copy supplier to copy the code circuit 6 so that also the copy printed circuit cards will be capable of giving the correct code word.

Figure 2:
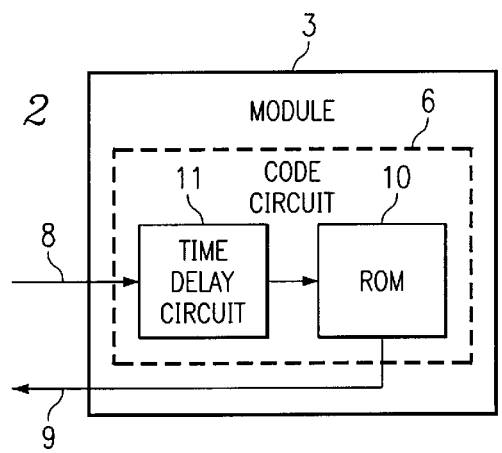
FIG. 2 shows a block diagram of a code circuit according to the invention.

This is remedied by the invention in that, for one thing, the code circuit 6 contains a large number of code words, and the control unit 5 can then request the code circuit to give an arbitrary one of the many code words via the connection 9. This may be done e.g. in that the code circuit 6, as shown in FIG. 2, contains a ROM 10 having a plurality of addresses, which each contain a code word. The control unit 5 then transmits a request for a code word and the address of the desired code word on the connection 8. The addresses and the code words may be transmitted via the connections 8, 9 as serial or parallel data depending on the structure of the system in general. In addition to the connections 8, 9, a plurality of connections will usually be provided between the apparatus 2 and the printed circuit cards 3, 4 owing to the proper function of the system. These connections do not concern the invention and are therefore not shown in the figure.

Although the many code words per se make it more difficult to copy the code circuit 6 or its ROM 10, it is however, still not impossible to do so, as it usually just takes a little longer to read one storage address at a time and then to copy it. Therefore, the circuit is designed such that it is not possible to read the contents of the individual storage cells quickly in succession, since, as shown in FIG. 2, it moreover contains a time delay circuit 11, which ensures that a certain time has to elapse between each output of the contents of a storage cell. This period of time may e.g. be of the order of one second. If e.g. a ROM of 64 kbytes is used, it will thus take 65,536 second, corresponding to a little more than 18 hours, to output all the code words. As will appear in more detail from the following, this time may be increased considerably by simple means. The circuit 11 may either just delay each output by said time, or it may release the contents of the storage cell right away and then prevent new output request until said period of time has elapsed. In the former case, this means that there will also be a delay at the first output after the start of the system or the connection of the printed circuit card. This means in both cases that correct code words can be output only when the individual storage cells are output at a suitably low rate such that it will be an impossible task to read the contents of the entire storage medium, thereby making it an impossible task to copy the code circuit 6. In the periods where a correct code word cannot be given owing to the time delay, the code circuit may be designed not to give a code word at all. This may e.g. be done in that the code word output or outputs are in a tristate mode or simply emit a byte exclusively containing 1s or 01. Alternatively, the circuit may be designed to give an arbitrary, but wrong code word during this period, thereby making it even more difficult to copy the contents, as it will not be known whether the code words output are actually correct. Examples of embodiment of the time delay circuit 11 will be described more fully below.

When a new module or printed circuit card, e.g. the printed circuit card 3, is to be connected to the system, the first step is to place the printed circuit card in e.g. a connector, thereby connecting it to the power supply of the system, and the control unit 5 will detect that a new printed circuit card has been connected to the system. The time delay circuit 11 on the printed circuit card 3 ensures that no correct code words can be output the first second after the connection of the printed circuit card. The control unit 5 will therefore wait one second and then generate a random address and request, via the connection 8, the code circuit 6 to give the associated code word. The circuit 6 finds the correct code word and returns it via the connection 9 to the control unit 5. The control unit 5 compares the received code word with a list reference code words, and if the code word received is correct, the printed circuit card will be accepted and added to the system. If, on the other hand, the code word received is wrong, the printed circuit card will be rejected.

It is important of course that the list of reference code words is concealed well, since, otherwise, it will be possible to copy the correct code words from it. Optionally, the list may be encrypted. If identical code circuits are used on all the modules, i.e. all of them contain the same code words on the same addresses, it will be an expedient solution simply to provide the control unit 5 with a code circuit 12 like the one used on the modules, since, then, the control unit is merely to address the same (random) address is its own code circuit 12 and in the code circuit 6 on the module just connected and then compare the two code words. This also means that, at the start of the entire system, the control unit 5 is just addressed the same (random) address in its own code circuit and in the code circuits on each of the connected modules, since the control unit is to expect the same answer from each module. As a result, the control unit does not have to wait one second between each inquiry to a module, which would delay the start of the system by a second per module. This would have been necessary if different code words were requested from each module, since, then, the control unit would have to address a new address in its own code circuit each time. To make it impossible that a copy module in this situation just reads on the data bus which code word is given from another module and then merely gives the same word itself, the control unit may be caused to inquire for a new and random code word from all the modules at regular intervals in operation. A copy module, which has managed to get through the start phase merely by giving the same answer as the other modules, will then be revealed by the next random inquiry.

Figure 3:
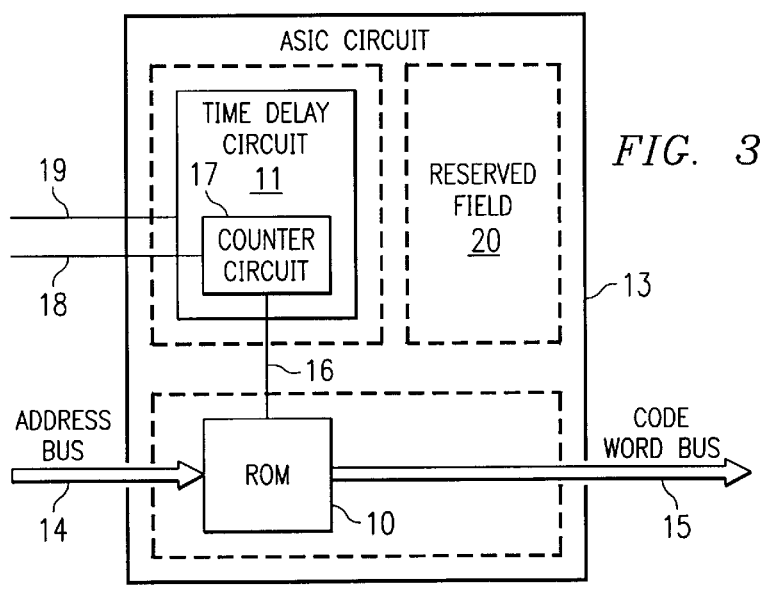
FIG. 3 shows an embodiment of the code circuit in which an external clock signal is used.

It is important that the storage 10 of the code circuit and the time delay circuit 11 are so arranged with respect to each other as to make it impossible to get access to the connections between the two circuits, since, otherwise, it would be possible to evade the time delay merely bypassing the time delay circuit 11 when outputting and copying the contents of the storage 10. Therefore, the code circuit 6 may advantageously be designed as a user-specified integrated circuit, also called ASIC. An example of an ASIC circuit 13 is shown in FIG. 3.

The circuit is composed of the two previously mentioned elements, the ROM 10 and time delay circuit 11. The ROM 10 is implemented such that the connections related to control reading from the ROM are present only internally in the ASIC. This prevents unauthorized reading of the storage contents. The read input 16 of the ROM is connected directly to the timer circuit 11. The address bus 14 and the code word bus 15 are external connections. The connections 14 and 15 may be parallel as well as serial, the serial embodiment being most frequently used in a practical design to occupy the fewest possible branch connections on the ASIC. The address 14 is used for addressing the ROM 10, in which the previously mentioned code words are already stored. When a code delay time determined by the timer has elapsed, the addressed code word is output on the code word bus 15 by activating the read input of the ROM.

The time delay circuit 11 is here shown implemented by means of a counter circuit 17, which divides a clock signal on the line 18. If a clock signal of e.g. 8 MHz is used, a count pulse per second may be obtained by dividing by $8*10^6$. The signal of 8 MHz may be a signal which is already used in the system and is therefore available on the printed circuit card concerned. The frequency may advantageously be selected closed to the maximum operating frequency of ASIC, since it will then be impossible to reduce the output time considerably merely by increasing the frequency of the clock signal 18.

The delay time begins to elapse when an address is applied to the address bus 14, or when the time delay circuit 11 is activated by a separate control signal 19. When the code delay time has elapsed, the read signal 16 of the ROM is activated, and the desired code word may be output on the code word bus 15. The ROM on the integrated ASIC can thus just be read at the intervals predetermined by the time delay circuit, which, as mentioned, are selected to have a duration of one second in the present example.

The field 20 on the ASIC just indicates that space for other components may be provided on the circuit.

Figure 4:
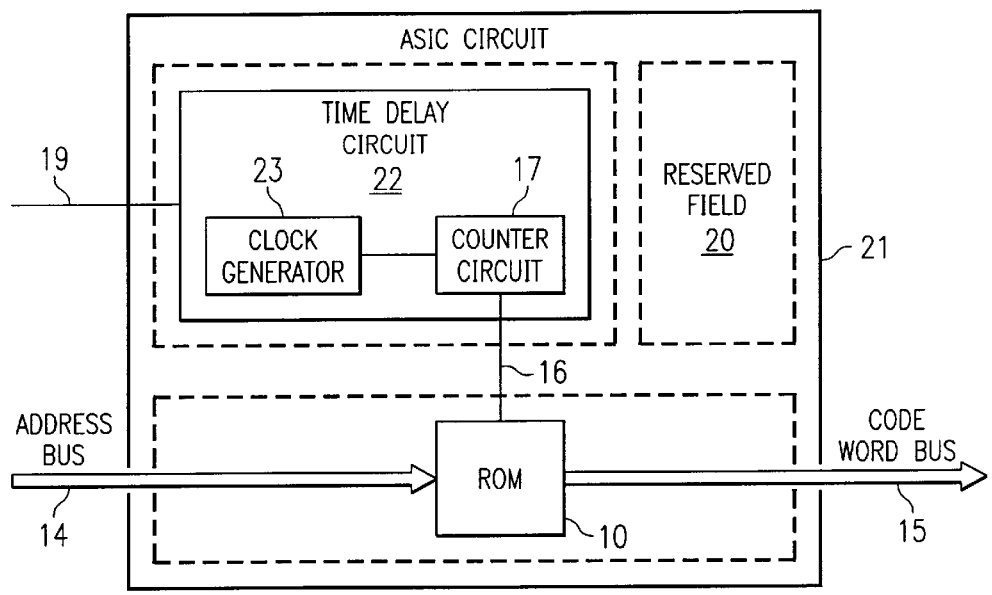
FIG. 4 shows an embodiment of the code circuit in which an internal clock generator is used.

FIG. 4 shows an ASIC circuit 21 having a somewhat differently designed time delay circuit 22. Instead of dividing an external clock signal 18, the circuit 22 here incorporates an internal clock generator 23 which can generate a corresponding clock signal itself, so that the time delay is completely independent of external signals. Such an internal clock generator may be implemented in a known manner e.g. by interconnecting two gates in a feedback loop. The rest of the circuit is unchanged with respect of FIG. 3.

It should be noted that, instead of ROM 10, it is possible to use other corresponding types of circuits, such as e.g. a storage of EEPROM type or a RAM. In the latter case, measures must be taken to avoid unintentionally erasure of the stored code words. The use of these storage types ensures that the code words need not be determined when the ASIC is designed, but may be input at a later time, e.g. in the manufacture of the module or a storage, it is possible to use a combinatorial circuit which is capable of calculating an associated code word on the basis of a bit pattern (i.e. the address) on the input. Such a circuit may be implemented in a known manner, provided that an algorithm to calculate the code words has been determined beforehand.

Figure 5:
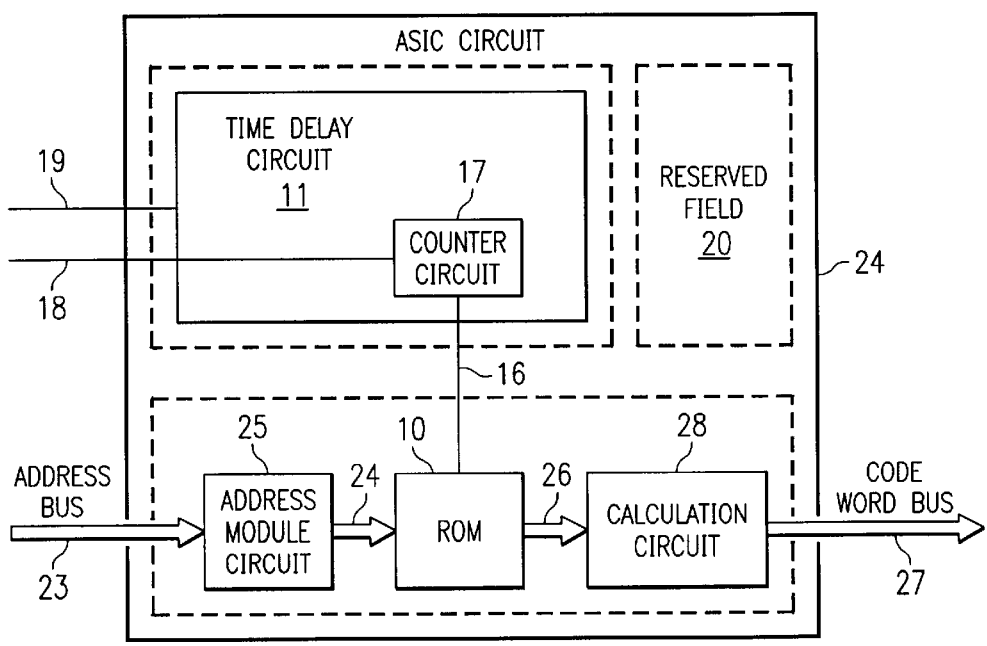
FIG. 5 shows an embodiment of the code circuit in which a modified address is calculated.

No matter whether a storage or a combinatorial circuit is used, the time it takes to output and copy the code circuit contents may be increased considerably by using an address having a larger number of bits than the one corresponding to the number of code words, and then modifying this address. This may be done e.g. as shown on the ASIC in FIG. 5, in which the ROM 10 may be of 64 kbytes here too, which means that it may be addressed by an address of 16 bits. An address modification circuit 25 receives an address of 32 bits via the address bus 23 and converts it into two addresses of 16 bits each. Each of these two addresses is used for addressing the associated code words in the storage 10 via the bus 24, and these are output via the bus 26 to a calculation circuit 28 calculating, from the two code words, a new code word which is returned to the control unit via the code word bus 27.

Alternatively, the address modification circuit 25 may be adapted to convert the address of 32 bits into a single new address of 16 bits, which then designates a code word in the ROM 10, as described earlier. In that case, the calculation circuit 28 may be omitted, since just a single code word is given from the ROM.

When an address of 32 bits is modified in this manner to one or more addresses of 16 bits, the time it takes to output the entire storage contents may be increased very considerably. Still assuming a time delay of 1 second between each output, it will take $2^{32}$ seconds to output all combinations, even though the storage is just 64 kbytes in reality. The $2^{32}$ seconds correspond to more than 136 years, which is more than sufficient in practice to prevent copying of the code circuit.

Finally, it should be mentioned that the connections 8, 9 between the apparatus 2 and the individual modules 3, 4 may be replaced by a wireless connection, as the apparatus and the modules may e.g. be provided with radio transmitters/receivers or infrared transmitters/receivers. This ensures that the principle may also be applied in systems in which the individual subcomponents are not already electrically interconnected. This may be the case e.g. with spare parts for cars or access cards to access control systems.

Although a preferred embodiment of the present invention has been described and illustrated, the invention is not restricted to it, but may also be embodied in many other ways within the scope of the subject matter defined in the following claims.

What is claimed is:

1. A circuit for providing a secure connection, comprising:
    a storage unit operable to store a plurality of code words;
    a time delay circuit operable to receive a request for a code word, the time delay circuit operable to provide the request to the storage unit, the storage unit operable to output one of the plurality of code words in response to the request, the time delay circuit operable to ensure that a predetermined period of time has elapsed between output of successive code words from the storage unit.

2. The circuit of claim 1, wherein the time delay circuit is operable to allow immediate output of the one of the plurality of code words associated with the request upon receipt of the request, the time delay circuit operable to delay outputting a code word in response to a subsequent request until the predetermined time period has elapsed.

3. The circuit of claim 1, wherein the time delay circuit is operable to delay providing the request to the storage unit until the predetermined time period has elapsed.

4. The circuit of claim 1, wherein the storage unit is operable to prevent output of a code word during the predetermined period of time.

5. The circuit of claim 1, wherein the storage unit is operable to output an invalid code word during the predetermined period of time.

6. The circuit of claim 1, wherein the time delay circuit includes a counter.

7. The circuit of claim 6, wherein the counter receives a clock signal, the counter operable to count from a start value associated with the predetermined period of time in response to the clock signal, the counter operable to generate a read signal for the storage unit upon reaching a stop value associated with an elapse of the predetermined period of time.

8. The circuit of claim 7, further comprising:
    an internal clock generator operable to generate the clock signal.

9. The circuit of claim 1, wherein the time delay circuit is activated by a control signal separate from the request.

10. The circuit of claim 1, wherein the time delay circuit is operable to begin elapsing the predetermined period of time in response to receipt of an address for the storage unit associated with the request.

11. A method for providing a secure connection, comprising:
    storing a plurality of code words;
    receiving a first request for a first code word;
    outputting the first code word in response to the request;
    receiving a second request for a second code word;
    outputting the second code word after a predetermined period of time has elapsed.

12. The method of claim 11, further comprising:
    providing no output during the predetermined period of time.

13. The method of claim 11, further comprising:
    outputting an invalid code word during the predetermined period of time.

14. The method of claim 11, wherein waiting a predetermined period of time includes counting from a start point associated with the predetermined period of time to a stop point associated with the predetermined period of time.

15. The method of claim 11, wherein waiting a predetermined period of time includes receiving a clock signal to determine the predetermined period of time.

16. The system of claim 11, further comprising:
    means for counting from a start point associated with the predetermined period of time to a stop point associated with the predetermined period of time.

17. The system of claim 11, further comprising:
    means for receiving a clock signal to determine the predetermined period of time.

18. A system for providing a secure connection, comprising:
    means for storing a plurality of code words;
    means for receiving a first request for a first code word;
    means for outputting the first code word in response to the request;
    means for receiving a second request for a second code word;
    means for outputting the second code word after a predetermined period of time has elapsed.

19. The system of claim 18, further comprising:
    means for providing no output during the predetermined period of time.

20. The system of claim 18, further comprising:
    means for outputting an invalid code word during the predetermined period of time.

* * * * *

UNITED STATES PATENT AND TRADEMARK OFFICE
CERTIFICATE OF CORRECTION

PATENT NO. : 6,739,504 B2
DATED : May 25, 2004
INVENTOR(S) : Kim Daugaard

It is certified that error appears in the above-identified patent and that said Letters Patent is hereby corrected as shown below:

Column 4,
Line 27, after "storage circuit of" delete "232" and insert -- $2^{32}$ --.
Line 28, after "it will take" delete "232" and insert -- $2^{32}$ --.

Signed and Sealed this

Twenty-eighth Day of June, 2005

JON W. DUDAS
*Director of the United States Patent and Trademark Office*